United States Patent
Miller et al.

(10) Patent No.: US 9,830,930 B2
(45) Date of Patent: Nov. 28, 2017

(54) VOICE-ENHANCED AWARENESS MODE

(71) Applicant: Knowles Electronics LLC, Itasca, IL (US)

(72) Inventors: Thomas E. Miller, Arlington Heights, IL (US); Sharon Gadonniex, Itasca, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/985,112

(22) Filed: Dec. 30, 2015

(65) Prior Publication Data

US 2017/0194020 A1  Jul. 6, 2017

(51) Int. Cl.
| | |
|---|---|
| *G10L 25/51* | (2013.01) |
| *H04R 1/10* | (2006.01) |
| *H04W 8/20* | (2009.01) |
| *G10L 21/0272* | (2013.01) |
| *G10K 11/178* | (2006.01) |

(52) U.S. Cl.
CPC ............ *G10L 25/51* (2013.01); *G10K 11/178* (2013.01); *G10L 21/0272* (2013.01); *H04R 1/1041* (2013.01); *H04R 1/1083* (2013.01); *H04W 8/205* (2013.01)

(58) Field of Classification Search
CPC ... G10L 21/0272; G10L 25/51; H04R 1/1083; H04W 8/205
See application file for complete search history.

(56) References Cited

U.S. PATENT DOCUMENTS

| | | | |
|---|---|---|---|
| 2,535,063 | A | 12/1950 | Halstead |
| 3,995,113 | A | 11/1976 | Tani |

(Continued)

FOREIGN PATENT DOCUMENTS

| | | |
|---|---|---|
| CN | 204119490 U | 1/2015 |
| CN | 204145685 U | 2/2015 |

(Continued)

OTHER PUBLICATIONS

Hegde, Nagaraj, "Seamlessly Interfacing MEMS Microphones with BlackfinTM Processors", EE350 Analog Devices, Rev. 1, Aug. 2010, pp. 1-10.

(Continued)

*Primary Examiner* — Mark Fischer
(74) *Attorney, Agent, or Firm* — Foley & Lardner LLP

(57) ABSTRACT

Systems and methods for providing ambient awareness are provided. An example method includes receiving an acoustic signal representing at least one captured ambient sound and determining that at least one triggering event has occurred based at least on the acoustic signal, a user profile, and a user context. In response to the determination, the method proceeds to modify, based on the at least one triggering event, the acoustic signal which represents the at least one captured ambient sound. The modified acoustic signal is provided to at least one ear canal of a user. In an exemplary embodiment, ambient sounds are selectively passed through automatically to a user based on certain triggering events, allowing a user to be able to hear sounds outside of headset while the user is wearing the headset. The triggering events may be selected by the user, for example, using a smartphone application.

21 Claims, 5 Drawing Sheets

(56) References Cited

U.S. PATENT DOCUMENTS

| | | |
|---|---|---|
| 4,150,262 A | 4/1979 | Ono |
| 4,455,675 A | 6/1984 | Bose et al. |
| 4,516,428 A | 5/1985 | Konomi |
| 4,520,238 A | 5/1985 | Ikeda |
| 4,588,867 A | 5/1986 | Konomi |
| 4,596,903 A | 6/1986 | Yoshizawa |
| 4,644,581 A | 2/1987 | Sapiejewski |
| 4,652,702 A | 3/1987 | Yoshii |
| 4,696,045 A | 9/1987 | Rosenthal |
| 4,975,967 A | 12/1990 | Rasmussen |
| 5,208,867 A | 5/1993 | Stites, III |
| 5,222,050 A | 6/1993 | Marren et al. |
| 5,251,263 A | 10/1993 | Andrea et al. |
| 5,282,253 A | 1/1994 | Konomi |
| 5,289,273 A | 2/1994 | Lang |
| 5,295,193 A | 3/1994 | Ono |
| 5,305,387 A | 4/1994 | Sapiejewski |
| 5,319,717 A | 6/1994 | Holesha |
| 5,327,506 A | 7/1994 | Stites, III |
| D360,691 S | 7/1995 | Mostardo |
| D360,948 S | 8/1995 | Mostardo |
| D360,949 S | 8/1995 | Mostardo |
| 5,490,220 A | 2/1996 | Loeppert |
| 5,734,621 A | 3/1998 | Ito |
| 5,870,482 A | 2/1999 | Loeppert et al. |
| D414,493 S | 9/1999 | Jiann-Yeong |
| 5,960,093 A | 9/1999 | Miller |
| 5,983,073 A | 11/1999 | Ditzik |
| 6,044,279 A | 3/2000 | Hokao et al. |
| 6,061,456 A | 5/2000 | Andrea et al. |
| 6,094,492 A | 7/2000 | Boesen |
| 6,118,878 A | 9/2000 | Jones |
| 6,122,388 A | 9/2000 | Feldman |
| 6,130,953 A | 10/2000 | Wilton et al. |
| 6,184,652 B1 | 2/2001 | Yang |
| 6,211,649 B1 | 4/2001 | Matsuda |
| 6,219,408 B1 | 4/2001 | Kurth |
| 6,255,800 B1 | 7/2001 | Bork |
| D451,089 S | 11/2001 | Hohl et al. |
| 6,362,610 B1 | 3/2002 | Yang |
| 6,373,942 B1 | 4/2002 | Braund |
| 6,408,081 B1 | 6/2002 | Boesen |
| 6,462,668 B1 | 10/2002 | Foseide |
| 6,535,460 B2 | 3/2003 | Loeppert et al. |
| 6,567,524 B1 | 5/2003 | Svean et al. |
| 6,661,901 B1 | 12/2003 | Svean et al. |
| 6,683,965 B1 | 1/2004 | Sapiejewski |
| 6,694,180 B1 | 2/2004 | Boesen |
| 6,717,537 B1 | 4/2004 | Fang et al. |
| 6,738,485 B1 | 5/2004 | Boesen |
| 6,748,095 B1 | 6/2004 | Goss |
| 6,751,326 B2 | 6/2004 | Nepomuceno |
| 6,754,358 B1 | 6/2004 | Boesen et al. |
| 6,754,359 B1 | 6/2004 | Svean et al. |
| 6,757,395 B1 | 6/2004 | Fang et al. |
| 6,801,632 B2 | 10/2004 | Olson |
| 6,847,090 B2 | 1/2005 | Loeppert |
| 6,879,698 B2 | 4/2005 | Boesen |
| 6,920,229 B2 | 7/2005 | Boesen |
| 6,931,292 B1 | 8/2005 | Brumitt et al. |
| 6,937,738 B2 | 8/2005 | Armstrong et al. |
| 6,987,859 B2 | 1/2006 | Loeppert et al. |
| 7,023,066 B2 | 4/2006 | Lee et al. |
| 7,024,010 B2 | 4/2006 | Saunders et al. |
| 7,039,195 B1 | 5/2006 | Svean et al. |
| 7,103,188 B1 | 9/2006 | Jones |
| 7,132,307 B2 | 11/2006 | Wang et al. |
| 7,136,500 B2 | 11/2006 | Collins |
| 7,203,331 B2 | 4/2007 | Boesen |
| 7,209,569 B2 | 4/2007 | Boesen |
| 7,215,790 B2 | 5/2007 | Boesen et al. |
| 7,289,636 B2 | 10/2007 | Saunders et al. |
| 7,302,074 B2 | 11/2007 | Wagner et al. |
| D573,588 S | 7/2008 | Warren et al. |
| 7,406,179 B2 | 7/2008 | Ryan |
| 7,433,481 B2 | 10/2008 | Armstrong et al. |
| 7,477,754 B2 | 1/2009 | Rasmussen et al. |
| 7,477,756 B2 | 1/2009 | Wickstrom et al. |
| 7,502,484 B2 | 3/2009 | Ngia et al. |
| 7,590,254 B2 | 9/2009 | Olsen |
| 7,680,292 B2 | 3/2010 | Warren et al. |
| 7,747,032 B2 | 6/2010 | Zei et al. |
| 7,773,759 B2 | 8/2010 | Alves et al. |
| 7,869,610 B2 | 1/2011 | Jayanth et al. |
| 7,889,881 B2 | 2/2011 | Ostrowski |
| 7,899,194 B2 | 3/2011 | Boesen |
| 7,965,834 B2 | 6/2011 | Alves et al. |
| 7,983,433 B2 | 7/2011 | Nemirovski |
| 8,005,249 B2 | 8/2011 | Wirola et al. |
| 8,019,107 B2 | 9/2011 | Ngia et al. |
| 8,027,481 B2 | 9/2011 | Beard |
| 8,045,724 B2 | 10/2011 | Sibbald |
| 8,072,010 B2 | 12/2011 | Lutz |
| 8,077,873 B2 | 12/2011 | Shridhar et al. |
| 8,081,780 B2 | 12/2011 | Goldstein et al. |
| 8,103,029 B2 | 1/2012 | Ngia et al. |
| 8,111,853 B2 | 2/2012 | Isvan |
| 8,116,489 B2 | 2/2012 | Mejia et al. |
| 8,116,502 B2 | 2/2012 | Saggio, Jr. et al. |
| 8,135,140 B2 | 3/2012 | Shridhar et al. |
| 8,180,067 B2 | 5/2012 | Soulodre |
| 8,189,799 B2 | 5/2012 | Shridhar et al. |
| 8,194,880 B2 | 6/2012 | Avendano |
| 8,199,924 B2 | 6/2012 | Wertz et al. |
| 8,213,643 B2 | 7/2012 | Hemer |
| 8,213,645 B2 | 7/2012 | Rye et al. |
| 8,229,125 B2 | 7/2012 | Short |
| 8,229,740 B2 | 7/2012 | Nordholm et al. |
| 8,238,567 B2 | 8/2012 | Burge et al. |
| 8,249,287 B2 | 8/2012 | Silvestri et al. |
| 8,254,591 B2 | 8/2012 | Goldstein et al. |
| 8,270,626 B2 | 9/2012 | Shridhar et al. |
| 8,285,344 B2 | 10/2012 | Kahn et al. |
| 8,295,503 B2 | 10/2012 | Sung et al. |
| 8,311,253 B2 | 11/2012 | Silvestri et al. |
| 8,315,404 B2 | 11/2012 | Shridhar et al. |
| 8,325,963 B2 | 12/2012 | Kimura |
| 8,331,604 B2 | 12/2012 | Saito et al. |
| 8,363,823 B1 | 1/2013 | Santos |
| 8,376,967 B2 | 2/2013 | Mersky |
| 8,385,560 B2 | 2/2013 | Solbeck et al. |
| 8,401,200 B2 | 3/2013 | Tiscareno et al. |
| 8,401,215 B2 | 3/2013 | Warren et al. |
| 8,416,979 B2 | 4/2013 | Takai |
| 8,462,956 B2 | 6/2013 | Goldstein et al. |
| 8,473,287 B2 | 6/2013 | Every et al. |
| 8,483,418 B2 | 7/2013 | Platz et al. |
| 8,488,831 B2 | 7/2013 | Saggio, Jr. et al. |
| 8,494,201 B2 | 7/2013 | Anderson |
| 8,498,428 B2 | 7/2013 | Schreuder et al. |
| 8,503,689 B2 | 8/2013 | Schreuder et al. |
| 8,503,704 B2 | 8/2013 | Francart et al. |
| 8,509,465 B2 | 8/2013 | Theverapperuma |
| 8,526,646 B2 | 9/2013 | Boesen |
| 8,532,323 B2 | 9/2013 | Wickstrom et al. |
| 8,553,899 B2 | 10/2013 | Salvetti et al. |
| 8,553,923 B2 | 10/2013 | Tiscareno et al. |
| 8,571,227 B2 | 10/2013 | Donaldson et al. |
| 8,594,353 B2 | 11/2013 | Anderson |
| 8,620,650 B2 | 12/2013 | Walters et al. |
| 8,634,576 B2 | 1/2014 | Salvetti et al. |
| 8,655,003 B2 | 2/2014 | Duisters et al. |
| 8,666,102 B2 | 3/2014 | Bruckhoff et al. |
| 8,681,999 B2 | 3/2014 | Theverapperuma et al. |
| 8,682,001 B2 | 3/2014 | Annunziato et al. |
| 8,705,787 B2 | 4/2014 | Larsen et al. |
| 8,837,746 B2 | 9/2014 | Burnett |
| 8,942,976 B2 | 1/2015 | Li et al. |
| 8,983,083 B2 | 3/2015 | Tiscareno et al. |
| 9,014,382 B2 | 4/2015 | Van De Par et al. |
| 9,025,415 B2 | 5/2015 | Derkx |
| 9,042,588 B2 | 5/2015 | Aase |
| 9,047,855 B2 | 6/2015 | Bakalos |
| 9,078,064 B2 | 7/2015 | Wickstrom et al. |

(56) References Cited

U.S. PATENT DOCUMENTS

| | | |
|---|---|---|
| 9,100,756 B2 | 8/2015 | Dusan et al. |
| 9,107,008 B2 | 8/2015 | Leitner |
| 9,123,320 B2 | 9/2015 | Carreras et al. |
| 9,154,868 B2 | 10/2015 | Narayan et al. |
| 9,167,337 B2 | 10/2015 | Shin |
| 9,185,487 B2 | 11/2015 | Solbach et al. |
| 9,208,769 B2 | 12/2015 | Azmi |
| 9,226,068 B2 | 12/2015 | Hendrix et al. |
| 9,264,823 B2 | 2/2016 | Bajic et al. |
| 2001/0011026 A1 | 8/2001 | Nishijima |
| 2001/0021659 A1 | 9/2001 | Okamura |
| 2001/0046304 A1 | 11/2001 | Rast |
| 2001/0049262 A1 | 12/2001 | Lehtonen |
| 2002/0016188 A1 | 2/2002 | Kashiwamura |
| 2002/0021800 A1 | 2/2002 | Bodley et al. |
| 2002/0038394 A1 | 3/2002 | Liang et al. |
| 2002/0054684 A1 | 5/2002 | Menzl |
| 2002/0056114 A1 | 5/2002 | Fillebrown et al. |
| 2002/0067825 A1 | 6/2002 | Baranowski et al. |
| 2002/0098877 A1 | 7/2002 | Glezerman |
| 2002/0136420 A1 | 9/2002 | Topholm |
| 2002/0159023 A1 | 10/2002 | Swab |
| 2002/0176330 A1 | 11/2002 | Ramonowski et al. |
| 2002/0183089 A1 | 12/2002 | Heller et al. |
| 2003/0002704 A1 | 1/2003 | Pronk |
| 2003/0013411 A1 | 1/2003 | Uchiyama |
| 2003/0017805 A1 | 1/2003 | Yeung et al. |
| 2003/0058808 A1 | 3/2003 | Eaton et al. |
| 2003/0085070 A1 | 5/2003 | Wickstrom |
| 2003/0207703 A1 | 11/2003 | Liou et al. |
| 2003/0223592 A1 | 12/2003 | Deruginsky et al. |
| 2005/0027522 A1 | 2/2005 | Yamamoto et al. |
| 2006/0029234 A1 | 2/2006 | Sargaison |
| 2006/0034472 A1 | 2/2006 | Bazarjani et al. |
| 2006/0153155 A1 | 7/2006 | Jacobsen et al. |
| 2006/0227990 A1 | 10/2006 | Kirchhoefer |
| 2006/0239472 A1 | 10/2006 | Oda |
| 2007/0104340 A1 | 5/2007 | Miller et al. |
| 2007/0127879 A1* | 6/2007 | Frank .................. H03G 3/32 386/234 |
| 2007/0147635 A1 | 6/2007 | Dijkstra et al. |
| 2008/0019548 A1 | 1/2008 | Avendano |
| 2008/0063228 A1 | 3/2008 | Mejia et al. |
| 2008/0101640 A1 | 5/2008 | Ballad et al. |
| 2008/0181419 A1 | 7/2008 | Goldstein et al. |
| 2008/0232621 A1 | 9/2008 | Burns |
| 2009/0041269 A1 | 2/2009 | Hemer |
| 2009/0080670 A1 | 3/2009 | Solbeck et al. |
| 2009/0182913 A1 | 7/2009 | Rosenblatt et al. |
| 2009/0207703 A1 | 8/2009 | Matsumoto et al. |
| 2009/0214068 A1 | 8/2009 | Wickstrom |
| 2009/0232325 A1* | 9/2009 | Lundquist ............ H03G 3/32 381/74 |
| 2009/0323982 A1 | 12/2009 | Solbach et al. |
| 2010/0022280 A1 | 1/2010 | Schrage |
| 2010/0081487 A1 | 4/2010 | Chen et al. |
| 2010/0183167 A1 | 7/2010 | Phelps et al. |
| 2010/0233996 A1 | 9/2010 | Herz et al. |
| 2010/0270631 A1 | 10/2010 | Renner |
| 2011/0257967 A1 | 10/2011 | Every et al. |
| 2012/0008808 A1 | 1/2012 | Saltykov |
| 2012/0056282 A1 | 3/2012 | Van Lippen et al. |
| 2012/0099753 A1 | 4/2012 | van der Avoort et al. |
| 2012/0197638 A1 | 8/2012 | Li et al. |
| 2012/0321103 A1 | 12/2012 | Smailagic et al. |
| 2013/0024194 A1 | 1/2013 | Zhao et al. |
| 2013/0051580 A1 | 2/2013 | Miller |
| 2013/0058495 A1 | 3/2013 | Furst et al. |
| 2013/0070935 A1 | 3/2013 | Hui et al. |
| 2013/0142358 A1 | 6/2013 | Schultz et al. |
| 2013/0272564 A1 | 10/2013 | Miller |
| 2013/0287219 A1 | 10/2013 | Hendrix et al. |
| 2013/0293723 A1* | 11/2013 | Benson ............ G02B 27/017 348/164 |
| 2013/0315415 A1 | 11/2013 | Shin |
| 2013/0322642 A1 | 12/2013 | Streitenberger et al. |
| 2013/0343580 A1 | 12/2013 | Lautenschlager et al. |
| 2013/0345842 A1 | 12/2013 | Karakaya et al. |
| 2014/0010378 A1 | 1/2014 | Voix et al. |
| 2014/0044275 A1 | 2/2014 | Goldstein et al. |
| 2014/0086425 A1 | 3/2014 | Jensen et al. |
| 2014/0169579 A1 | 6/2014 | Azmi |
| 2014/0233741 A1 | 8/2014 | Gustavsson |
| 2014/0270200 A1 | 9/2014 | Usher et al. |
| 2014/0270231 A1 | 9/2014 | Dusan et al. |
| 2014/0273851 A1 | 9/2014 | Donaldson et al. |
| 2014/0348346 A1 | 11/2014 | Fukuda |
| 2014/0355787 A1 | 12/2014 | Jiles et al. |
| 2015/0025881 A1 | 1/2015 | Avendano et al. |
| 2015/0043741 A1 | 2/2015 | Shin |
| 2015/0055810 A1 | 2/2015 | Shin |
| 2015/0078574 A1 | 3/2015 | Shin |
| 2015/0110280 A1 | 4/2015 | Wardle |
| 2015/0161981 A1 | 6/2015 | Kwatra |
| 2015/0172814 A1 | 6/2015 | Usher et al. |
| 2015/0237448 A1 | 8/2015 | Loeppert |
| 2015/0243271 A1 | 8/2015 | Goldstein |
| 2015/0245129 A1 | 8/2015 | Dusan et al. |
| 2015/0264472 A1 | 9/2015 | Aase |
| 2015/0296305 A1 | 10/2015 | Shao et al. |
| 2015/0296306 A1 | 10/2015 | Shao et al. |
| 2015/0304770 A1 | 10/2015 | Watson et al. |
| 2015/0310846 A1 | 10/2015 | Andersen et al. |
| 2015/0325229 A1 | 11/2015 | Carreras et al. |
| 2015/0325251 A1 | 11/2015 | Dusan et al. |
| 2015/0365770 A1 | 12/2015 | Lautenschlager |
| 2015/0382094 A1 | 12/2015 | Grinker et al. |
| 2015/0382123 A1* | 12/2015 | Jobani ................ H04R 1/1016 700/98 |
| 2016/0007119 A1 | 1/2016 | Harrington |
| 2016/0021480 A1 | 1/2016 | Johnson et al. |
| 2016/0029345 A1 | 1/2016 | Sebeni et al. |
| 2016/0037261 A1 | 2/2016 | Harrington |
| 2016/0037263 A1 | 2/2016 | Pal et al. |
| 2016/0042666 A1 | 2/2016 | Hughes |
| 2016/0044151 A1 | 2/2016 | Shoemaker et al. |
| 2016/0044398 A1 | 2/2016 | Siahaan et al. |
| 2016/0044424 A1 | 2/2016 | Dave et al. |
| 2016/0060101 A1 | 3/2016 | Loeppert |
| 2016/0105748 A1 | 4/2016 | Pal et al. |
| 2016/0150335 A1 | 5/2016 | Qutub et al. |
| 2016/0165334 A1 | 6/2016 | Grossman |
| 2016/0165361 A1 | 6/2016 | Miller et al. |

FOREIGN PATENT DOCUMENTS

| | | |
|---|---|---|
| CN | 204168483 U | 2/2015 |
| CN | 0204669605 U | 9/2015 |
| CN | 204681587 U | 9/2015 |
| CN | 204681593 U | 9/2015 |
| CN | ZL2015203769650 | 9/2015 |
| CN | ZL2015204747042 | 9/2015 |
| CN | ZL2015204903074 | 9/2015 |
| DE | 915826 | 7/1954 |
| DE | 3723275 | 3/1988 |
| DE | 102009051713 | 5/2011 |
| DE | 102011003470 | 8/2012 |
| EP | 0124870 | 11/1984 |
| EP | 0500985 | 9/1992 |
| EP | 0684750 | 11/1995 |
| EP | 0806909 | 11/1997 |
| EP | 1299988 | 4/2003 |
| EP | 1509065 | 2/2005 |
| EP | 1310136 B1 | 3/2006 |
| EP | 1469701 B1 | 4/2008 |
| EP | 2434780 | 3/2012 |
| EP | 2 661 097 A2 | 11/2013 |
| JP | S5888996 A | 5/1983 |
| JP | S60103798 | 6/1985 |
| JP | 2007150743 A | 6/2007 |
| JP | 2012169828 A | 9/2012 |
| JP | 5049312 B2 | 10/2012 |
| KR | 20110058769 A | 6/2011 |
| KR | 101194904 B1 | 10/2012 |

(56) References Cited

FOREIGN PATENT DOCUMENTS

| KR | 1020140026722 A | 3/2014 |
|---|---|---|
| WO | WO8303733 | 10/1983 |
| WO | WO9407342 | 3/1994 |
| WO | WO9623443 | 8/1996 |
| WO | WO0025551 | 5/2000 |
| WO | WO0217835 | 3/2002 |
| WO | WO0217836 | 3/2002 |
| WO | WO0217837 | 3/2002 |
| WO | WO0217838 | 3/2002 |
| WO | WO0217839 | 3/2002 |
| WO | WO03073790 | 9/2003 |
| WO | WO2006114767 A1 | 11/2006 |
| WO | WO2007073818 | 7/2007 |
| WO | WO2007082579 | 7/2007 |
| WO | WO2007147416 | 12/2007 |
| WO | WO2008128173 | 10/2008 |
| WO | WO2009012491 | 1/2009 |
| WO | WO2009023784 | 2/2009 |
| WO | WO2011051469 | 5/2011 |
| WO | WO2011061483 | 5/2011 |
| WO | WO2013033001 A1 | 3/2013 |
| WO | WO-2014/022359 A2 | 2/2014 |
| WO | WO-2015/103578 A1 | 7/2015 |
| WO | WO2016085814 A1 | 6/2016 |
| WO | WO2016089671 A1 | 6/2016 |
| WO | WO2016089745 A1 | 6/2016 |

OTHER PUBLICATIONS

Korean Office Action regarding Application No. 10-2014-7008553, dated May 21, 2015.
Written Opinion of the International Searching Authority and International Search Report dated Jan. 21, 2013 in Patent Cooperation Treaty Application No. PCT/US2012/052478, filed Aug. 27, 2012.
Langberg, Mike, "Bluelooth Sharpens Its Connections," Chicago Tribune, Apr. 29, 2002, Business Section, p. 3, accessed Mar. 11, 2016 at URL: <http://articles.chicagotribune.com/2002-04-29/business/0204290116_1_bluetooth-enabled-bluetooth-headset-bluetooth-devices>.
Duplan Corporaton vs. Deering Milliken decision, 197 USPQ 342.
Combined Bluetooth Headset and USB Dongle, Advance Information, RTX Telecom A/S, vol. 1, Apr. 6, 2002.
International Search Report and Written Opinion for Patent Cooperation Treaty Application No. PCT/US2015/062940 dated Mar. 28, 2016 (10 pages).
International Search Report and Written Opinion for Patent Cooperation Treaty Application No. PCT/US2015/062393 dated Apr. 8, 2016 (9 pages).
International Search Report and Written Opinion for Patent Cooperation Treaty Application No. PCT/US2015/061871 dated Mar. 29, 2016 (9 pages).
Yen, Kuan-Chieh et al., "Microphone Signal Fusion", U.S. Appl. No. 14/853,947, filed Sep. 14, 2015.
Yen, Kuan-Chieh et al., "Audio Monitoring and Adaptation Using Headset Microphones Inside User's Ear Canal", U.S. Appl. No. 14/985,187, filed Dec. 30, 2015.
Gadonniex, Sharon et al., "Occlusion Reduction and Active Noise Reduction Based on Seal Quality", U.S. Appl. No. 14/985,057, filed Dec. 30, 2015.
Verma, Tony, "Context Aware False Acceptance Rate Reduction", U.S. Appl. No. 14/749,425, filed Jun. 24, 2015.
Ephraim, Y. et al., "Speech enhancement using a minimum mean-square error short-time spectral amplitude estimator," IEEE Transactions on Acoustics, Speech, and Signal Processing, vol. ASSP-32, No. 6, Dec. 1984, pp. 1109-1121.
Sun et al., "Robust Noise Estimation Using Minimum Correction with Harmonicity Control." Conference: INTERSPEECH 2010, 11th Annual Conference of the International Speech Communication Association, Makuhari, Chiba, Japan, Sep. 26-30, 2010. p. 1085-1088.
Lomas, "Apple Patents Earbuds With Noise-Canceling Sensor Smarts," Aug. 27, 2015. [retrieved on Sep. 16, 2015]. TechCrunch. Retrieved from the Internet: <URL: http://techcrunch.com/2015/08/27/apple-wireless-earbuds-at-last/>. 2 pages.
Smith, Gina, "New Apple Patent Applications: The Sound of Hearables to Come," aNewDomain, Feb. 12, 2016, accessed Mar. 2, 2016 at URL: <http://anewdomain.net/2016/02/12/new-apple-patent-applications-glimpse-hearables-come/>.
Qutub, Sarmad et al., "Acoustic Apparatus with Dual MEMS Devices," U.S. Appl. No. 14/872,887, filed Oct. 1, 2015.
Office Action dated Feb. 4, 2016 in U.S. Appl. No. 14/318,436, filed Jun. 27, 2014.
Office Action dated Jan. 22, 2016 in U.S. Appl. No. 14/774,666, filed Sep. 10, 2015.
International Search Report and Written Opinion, PCT/US2016/069012, Knowles Electronics, LLC, 11 pages (Apr. 25, 2017).
Notice of Allowance, dated Sep. 27, 2012, U.S. Appl. No. 13/568,989, filed Aug. 7, 2012.
Non-Final Office Action, dated Sep. 23, 2015, U.S. Appl. No. 13/224,068, filed Sep. 1, 2011.
Non-Final Office Action, dated Mar. 10, 2004, U.S. Appl. No. 10/138,929, filed May 3, 2002.
Final Office Action, dated Jan. 12, 2005, U.S. Appl. No. 10/138,929, filed May 3, 2002.
Non-Final Office Action, dated Jan. 12, 2006, U.S. Appl. No. 10/138,929, filed May 3, 2002.
Notice of Allowance dated Mar. 21, 2016, U.S. Appl. No. 14/853,947, filed Sep. 14, 2015.
Final Office Action dated May 12, 2016, U.S. Appl. No. 13/224,068, filed Sep. 1, 2011.

\* cited by examiner

VOICE-ENHANCED AWARENESS MODE

FIELD

The present application relates generally to audio processing and, more specifically, to systems and methods for ambient awareness.

BACKGROUND

Noise isolating headsets are designed to provide high isolation from sounds, including voices and other noise, in the environment outside (ambient) of the headset. However, there are many situations in which a user wearing a noise isolating headset may want or need to hear sounds coming from the ambient environment. Typical noise isolating headsets may provide simple manual solutions for allowing in outside noises, for example, a button to turn off noise suppression or noise cancellation. However, it may be difficult to find the button when needed. Additionally, in some situations, a noise isolating headset wearer (user) may not hear alarm sounds warning him or her of a danger, for example. Thus, better control of noise suppression and noise cancellation in noise isolating headsets is desired.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Systems and methods for ambient awareness are provided. An example method includes receiving an acoustic signal. The acoustic signal may include at least one captured ambient sound. The example method includes determining that at least one triggering event has occurred based at least on one of the following: the acoustic signal, a user profile, and a user context. In response to the determination, the example method modifies, based on the at least one triggering event, the acoustic signal which includes the at least one captured ambient sound. The example method allows providing the modified acoustic signal to at least one ear canal of a user.

In some embodiments, the modification includes adjustment of noise suppression performed on the acoustic signal based on the user profile. In certain embodiments, the triggering event includes detection of a moving object. In some embodiments, the triggering event includes detection of a specific sound in the acoustic signal. The specific sound can include one or more of the following: a voice of a person, a voice sound including a person's name, at least one pre-determined word being spoken, a sound of a car horn, a sound of a siren, and a sound of a baby crying, according to some embodiments.

In certain embodiments, the modification of the acoustic signal includes separating the acoustic signal into a voice component and a noise component. The voice component can be preserved in the acoustic signal while the noise component is suppressed.

In some embodiments, the method includes providing to the user at least one of the following: an alert signal and a warning message based on the triggering event.

In other embodiments, the user context includes one or more of the following: a schedule in a user calendar, a user location, a day of week, a time of day, a current user location, and a current user movement.

In some embodiments, the user profile includes at least one definition of the at least one triggering event and at least one rule for modifying the acoustic signal when the at least one triggering event occurs. In certain embodiments, the method provides an application, for a smartphone for instance, for customizing the user profile. The at least one triggering event may be based on a combination of at least two of the acoustic signal, the user profile, and the user context.

According to another example embodiment of the present disclosure, the steps of the method for ambient awareness are stored on a non-transitory machine-readable medium comprising instructions, which, when implemented by one or more processors, perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The present technology provides systems and methods for ambient awareness, which can overcome or substantially alleviate problems associated with using noise isolating headsets when some ambient sounds are desired to be heard by a user. Various embodiments of the present technology may be practiced with any earpiece-based audio device configured to receive and/or provide audio such as, but not limited to, cellular phones, MP3 players, phone handsets, and headsets. While some embodiments of the present technology are described in reference to operation of a cellular phone, the present technology may be practiced with any audio device.

While wearing a noise isolating headset, it may be useful for the wearer to turn off or decrease the noise isolation and allow some ambient sound to pass through. Various embodiments facilitate controlling the amount of ambient sounds passing through the headset by configuring noise suppression based on certain triggering events. The triggering events may be determined based on an analysis of the ambient sounds, user profile, and user's context. Further, the triggering events may utilize voice detection, proximity detection of moving objects, events in the user's calendar, location of the user, and so forth.

An example method for ambient awareness includes receiving an acoustic signal. The acoustic signal includes at least one captured ambient sound. The method includes determining that at least one triggering event has occurred based at least on one of the following: the acoustic signal, a user profile, and a user context. In response to the determination, the method includes modifying, based on the at least one triggering event, the acoustic signal (which includes the at least one captured ambient sound).

Figure 1:
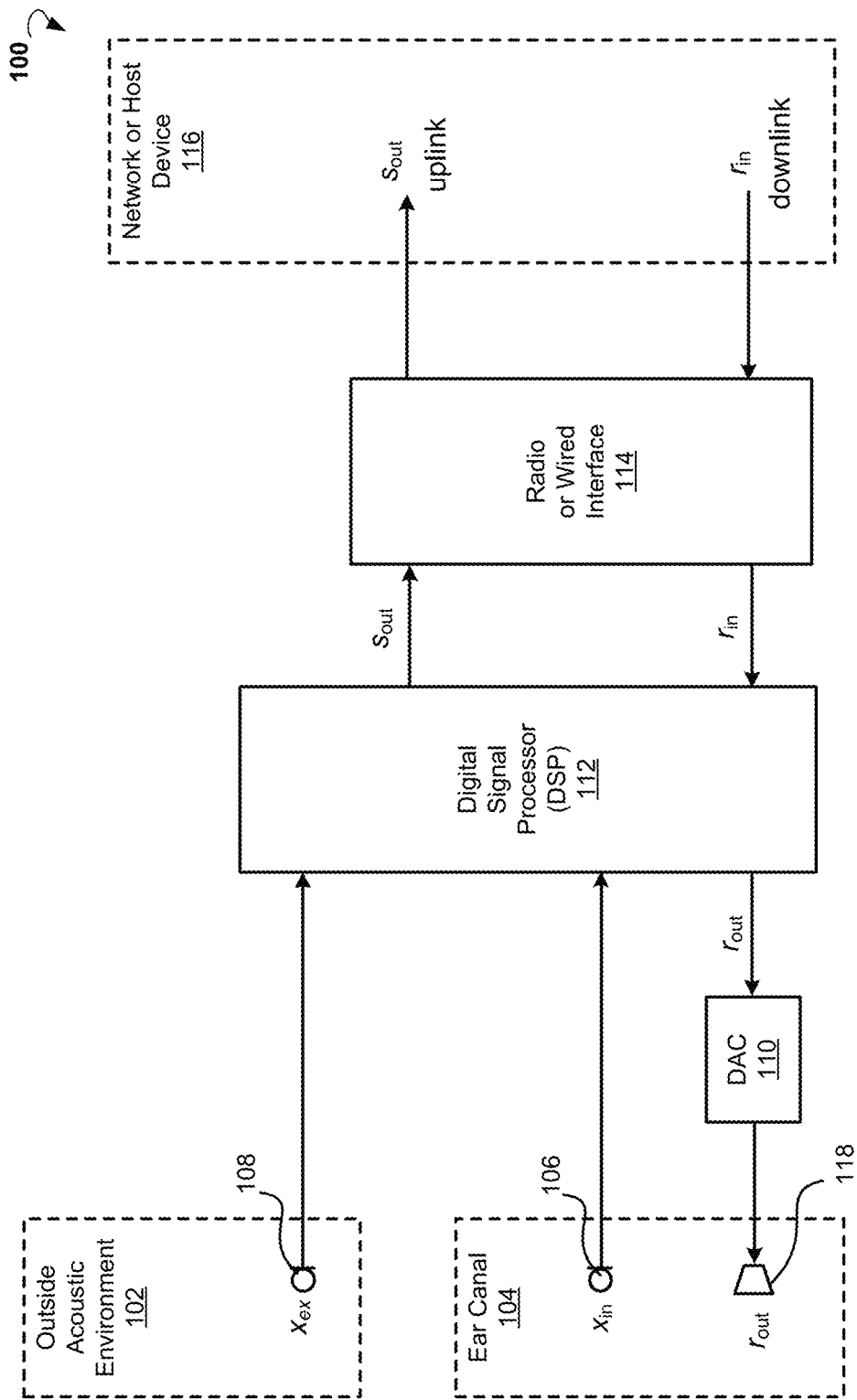
FIG. 1 is a block diagram of a system and an environment in which systems and methods described herein can be used.

Referring now to FIG. 1, a block diagram of an example system 100 suitable for implementation of methods for providing ambient awareness and environment thereof are shown. The example system 100 includes at least an internal microphone 106, an external microphone 108, a digital signal processor (DSP) 112, and a radio or wired interface 114. The internal microphone 106 is located inside a user's ear canal 104 and is relatively shielded from the outside acoustic environment 102. The external microphone 108 is located outside of the user's ear canal 104 and is exposed to the outside (ambient) acoustic environment 102.

In various embodiments, the microphones 106 and 108 are either analog or digital. In either case, the outputs from the microphones are converted into synchronized pulse code modulation (PCM) format at a suitable sampling frequency and connected to the input port of the DSP 112. The signals $x_{in}$ and $x_{ex}$ denote signals representing sounds captured by the internal microphone 106 and external microphone 108, respectively.

The DSP 112 performs appropriate signal processing tasks to improve the quality of microphone signals $x_{in}$ and $x_{ex}$, according to some embodiments. The output of DSP 112, referred to as the send-out signal ($s_{out}$), is transmitted to the desired destination, for example, to a network or host device 116 (see signal identified as $s_{out}$ uplink), through a radio or wired interface 114.

In certain embodiments, if a two-way voice communication is needed, a signal is received by the network or host device 116 from a suitable source (e.g., via the radio or wired interface 114). This can be referred to as the receive-in signal ($r_{in}$) (identified as $r_{in}$ downlink at the network or host device 116). The receive-in signal can be coupled via the radio or wired interface 114 to the DSP 112 for necessary processing. The resulting signal, referred to as the receive-out signal ($r_{out}$), is converted into an analog signal through a digital-to-analog convertor (DAC) 110 and then connected to a loudspeaker 118 in order to be presented to the user. In some embodiments, the loudspeaker 118 is located in the same ear canal 104 as the internal microphone 106. In other embodiments, the loudspeaker 118 is located in the ear canal opposite the ear canal 104. In example of FIG. 1, the loudspeaker 118 is found in the same ear canal 104 as the internal microphone 106, therefore, an acoustic echo canceller (AEC) may be needed to prevent the feedback of the received signal to the other end. Optionally, in some embodiments, if no further processing on the received signal is necessary, the receive-in signal ($r_{in}$) can be coupled to the loudspeaker without going through the DSP 112.

In some embodiments, the receive-in signal $r_{in}$ includes an audio content for playing back to a user. The audio content can be stored on a host device or received by the network or host device 116 from a communication network.

Figure 2:
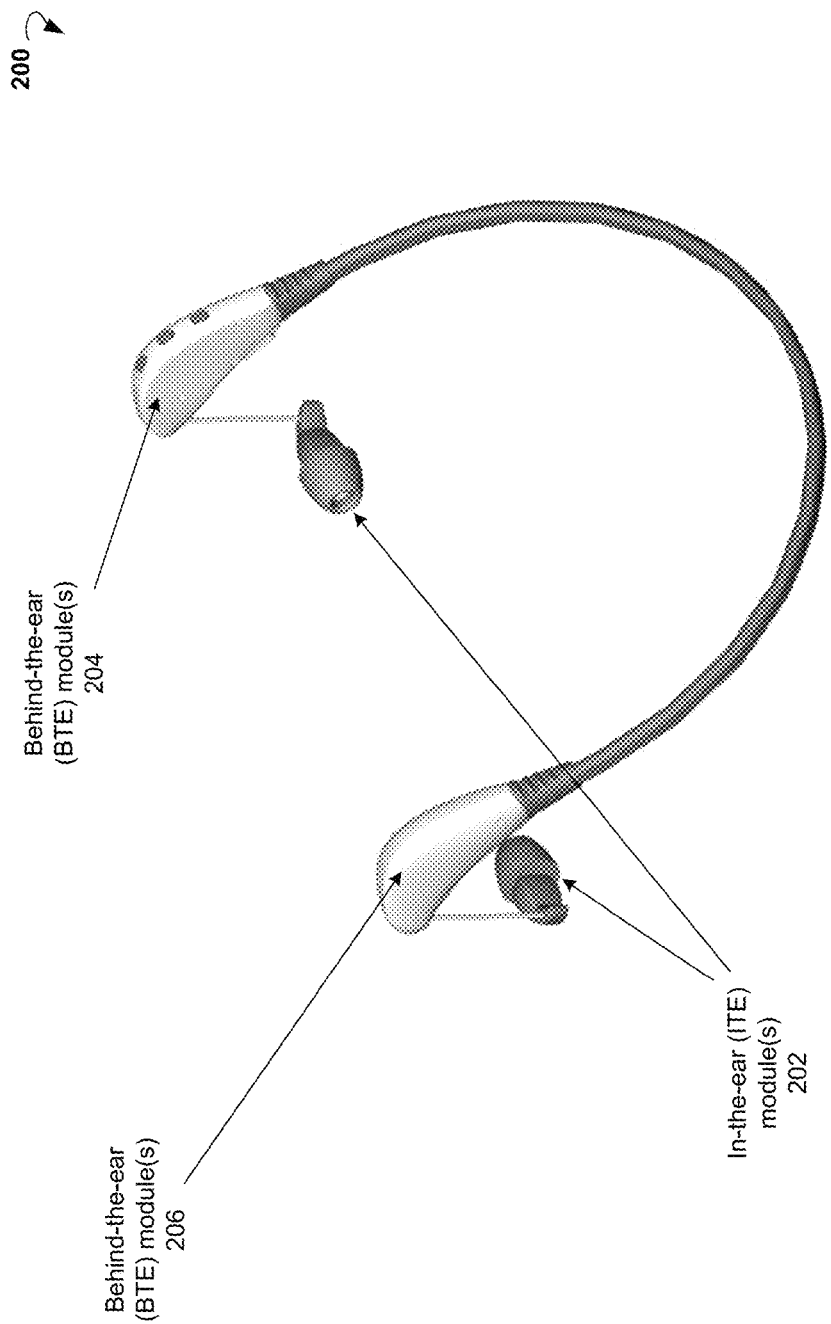
FIG. 2 is a block diagram of a headset suitable for implementing the present technology, according to an example embodiment.

FIG. 2 shows an example headset 200 suitable for implementing methods of the present disclosure. The headset 200 includes example in-the-ear (ITE) module(s) 202 and behind-the-ear (BTE) modules 204 and 206 for each ear of a user. The ITE module(s) 202 are configured to be inserted into the user's ear canals. The BTE modules 204 and 206 are configured to be placed behind the user's ears. In some embodiments, the headset 200 communicates with host devices through a Bluetooth radio link. The Bluetooth radio link may conform to a Bluetooth Low Energy (BLE) or other Bluetooth standard and may be variously encrypted for privacy.

In various embodiments, ITE module(s) 202 include internal microphone(s) 106 and the loudspeaker(s) 118 (shown in FIG. 1), all facing inward with respect to the ear canal. The ITE module(s) 202 can provide acoustic isolation between the ear canal(s) 104 and the outside acoustic environment 102 (also shown in FIG. 1).

In some embodiments, each of the BTE modules 204 and 206 includes at least one external microphone. The BTE module 204 may include a DSP, control button(s), and Bluetooth radio link to host devices. The BTE module 206 can include a suitable battery with charging circuitry.

The external microphone signal $x_{ex}$ may be used to perform a noise suppression (for example, an active noise cancellation) to cancel outside ambient noise inside the ITE module(s) 202. In other embodiments, processing of the external microphone signal $x_{ex}$ is performed by DSP 112 (shown in FIG. 1). In certain embodiments, processing of the external microphone signal $x_{ex}$ is performed by network or host device 116.

In some embodiments, BTE modules 204 and 206 include one or more sensors, including but not limited to an accelerometer, magnetometer, gyroscope, Inertial Measurement Unit (IMU), temperature sensor, altitude sensor, proximity sensor, barometer, humidity sensor, color sensor, light sensor, pressure sensor, Global Positioning System (GPS) module, beacon, WiFi sensor, ultrasound sensor, infrared sensor, and touch sensor. In certain embodiment, the BTE modules 204 and 206 are operable to receive a sensor data and a user data from an audio device the headset 200 is coupled to.

Figure 3:
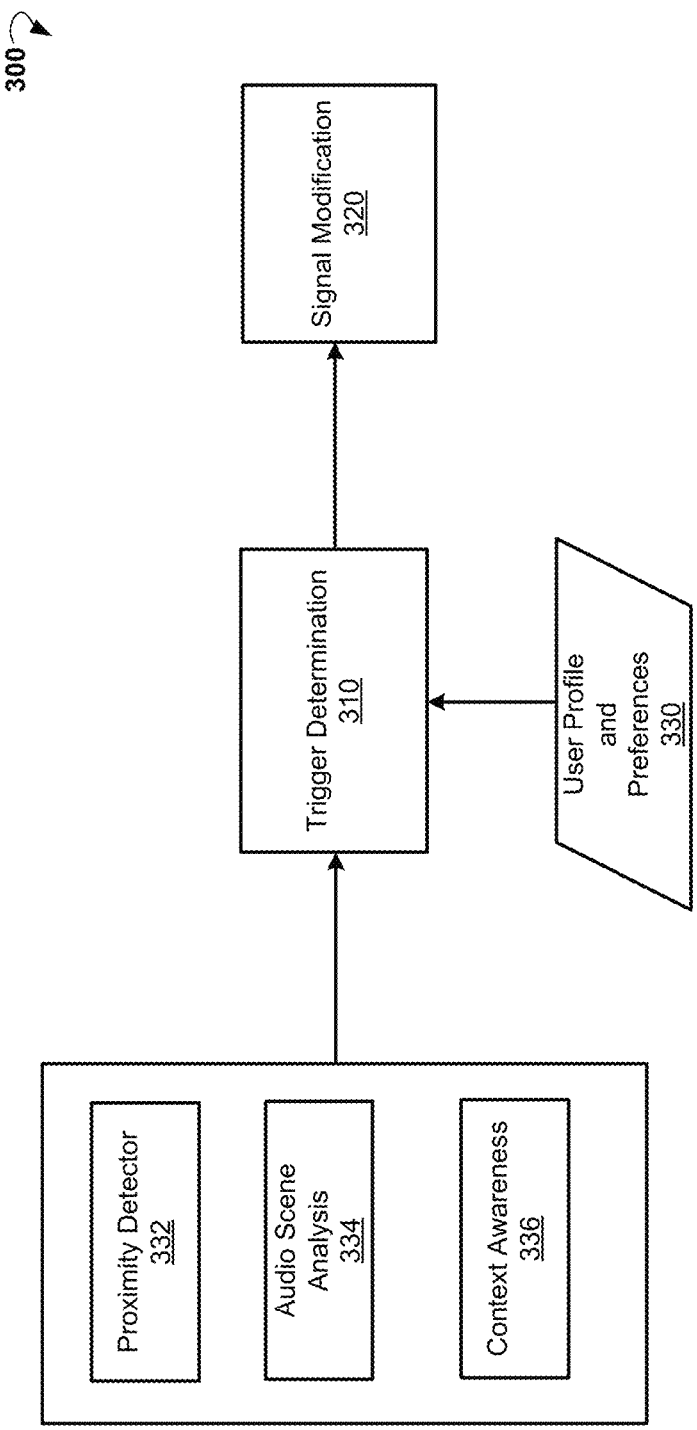
FIG. 3 is a block diagram illustrating a system for providing ambient awareness, according to an example embodiment.

FIG. 3 is a block diagram illustrating system 300 for providing ambient awareness, according to an example embodiment. In some embodiments, the system 300 is operable to control noise suppression of ambient sound inside earpieces of a headset, for example, the ITE module(s) 202. The system 300 can include a trigger determination module 310 and a signal modification module 320. The modules 310 and 320 of system 300 can be implemented within the DSP 112 and/or network or host device 116 (as shown in the example in FIG. 1).

In some embodiments, the signal modification module 320 is operable to receive external microphone signal $x_{ex}$. A feedforwarding signal is generated based on the external microphone signal $x_{ex}$. When played back by loudspeaker inside an earpiece, the acoustic signal corresponding to the feedforward signal cancels outside ambient noise leaking into the earpiece. In certain embodiments, a feedback signal is generated based on internal microphone signal $x_{in}$. The feedback signal can be played inside an earpiece to cancel some of the unwanted noise inside the earpiece. In some embodiments, both the internal microphone signals and external microphone signals are used for noise cancellation. In some other embodiments, only one of the internal or external microphone signal is used for the noise cancellation. In other embodiments, the amount of the noise suppression or cancellation of outside ambient sounds is controlled in response to a determination that a specific triggering event has occurred.

An example audio processing system suitable for performing noise suppression is discussed in more detail in U.S. patent application Ser. No. 12/832,901 (now U.S. Pat. No. 8,473,287), entitled "Method for Jointly Optimizing Noise Reduction and Voice Quality in a Mono or Multi-Microphone System," filed Jul. 8, 2010, the disclosure of which is incorporated herein by reference for all purposes. By way of example and not limitation, noise suppression methods are described in U.S. patent application Ser. No. 12/215,980 (now U.S. Pat. No. 9,185,487), entitled "System and Method for Providing Noise Suppression Utilizing Null Processing Noise Subtraction," filed Jun. 30, 2008, and in U.S. patent application Ser. No. 11/699,732 (now U.S. Pat. No. 8,194,880), entitled "System and Method for Utilizing Omni-Directional Microphones for Speech Enhancement," filed Jan. 29, 2007, which are incorporated herein by reference in their entireties.

In some embodiments, the trigger determination module 310 is operable to determine that at least one triggering event (also referred to as a trigger) has occurred and, in response to the determination, control modification of outside ambient sound performed by the signal modification module 320 (e.g., the amount of noise suppression or ambient sound passing through). The ambient awareness refers to a state of minimal noise suppression, where ambient (outside) sounds are passed through so that the user can hear them. A certain amount of processing of ambient sounds during the ambient awareness mode may still be performed, e.g., compression or equalization (EQ) balancing. In some embodiments, noise suppression is varied so that little or no ambient sounds are passed through. In other embodiments, in response to a triggering event, a voice enhancement is applied to ambient sound captured by an external microphone. The ambient sound can be selectively filtered to pass a voice component, while reducing an amount of noise present in the ambient sound. The voice enhancement may be helpful during a conversation in a noisy environment. For example, the noisy environment can include an airplane sound. When a flight attendant speaks, the airplane sound can be sufficiently reduced in a user's headset, such that the user can hear mostly the flight attendant's voice. Similarly, in other noisy environments, for example, a street environment, other important sounds can be emphasized, while reducing street noise in a user's headset. In yet other embodiments, a modification of ambient sound includes equalization, level modification, time and frequency alternations, and other appropriate changes (modifications). Multiple microphones (e.g., external microphone(s) and internal microphone(s)) may be used for the noise suppression. An example system suitable for performing noise suppression using multiple microphones is discussed in more detail in U.S. patent application Ser. No. 12/832,901 (now U.S. Pat. No. 8,473,287).

In some embodiments, the number of triggers and effects of triggers on the noise suppression is configured using an application run on a device (for example, a smartphone or a computer) communicatively coupled to the headset. The triggering events may be selected by a user using a smartphone app, for example, triggering by the sound of a baby crying, a siren, certain contexts such as the user speaking and not being on a phone call, or some other selected sound.

The trigger determination may include proximity detection. In certain embodiments, the system 300 includes a proximity detector module 332. The proximity detector module 332 may be operable to identify an object (for example, a vehicle) moving towards a user of headset 200 at a speed exceeding a predetermined threshold value. Detection of the object may be made utilizing a proximity sensor included with the headset which may be variously an infrared proximity sensor, ultrasound proximity sensor, and other suitable proximity sensor. Upon detection of the moving object, audio content of the $r_{in}$ can be muted and the noise suppression of ambient sounds can be turned off to pass the ambient sounds through earpieces of the headset. Instead of being turned off, in some embodiments, an audio content is equalized or the volume of the audio content is lowered to make the audio content less distractive to ambient sounds. If an approaching object is moving faster than the predetermined threshold value, an alarm can be issued, for example, a warning sound can be played.

In some embodiments, the system 300 includes an audio scene analysis module 334. In other embodiments, the system 300 is operable to turn noise suppression up and down, based on the results of audio scene analysis. In certain embodiments, the audio scene analysis includes voice activity detection. The voice detection may be provided by a microphone that includes voice activity detection. An exemplary microphone is discussed in more detail in U.S. patent application Ser. No. 14/797,310, entitled "Microphone Apparatus and Method with Catch-up Buffer", filed Jul. 13, 2015, the disclosure of which is incorporated herein by reference for all purposes.

Voice detection may be performed by sound processing that distinguishes various sounds. An exemplary system for sound processing is discussed in more detail in U.S. patent application Ser. No. 12/832,901 (now U.S. Pat. No. 8,473,287), entitled "Method for Jointly Optimizing Noise Reduction and Voice Quality in a Mono or Multi-Microphone System," filed Jul. 8, 2010, the disclosure of which is incorporated herein by reference for all purposes. The voice activity detection may be utilized with voice recognition. For example, if someone pronounces the name of a user of the headset 200 or the user utters a voice command, trigger determination module 310 can issue a control command to signal modification module 320 to pass ambient sounds through earpieces of the headset 200. In various embodiments, the audio scene analysis includes recognition of other sounds, such as detection of horns beeping, pre-determined spoken words, someone calling the name of the user, a baby crying, and so forth.

In certain embodiments, the system 300 includes voice detection of the user. The system 300 can be operable to turn on ambient awareness when the user starts speaking while there is no detection of a phone call being in progress.

In some embodiments, the system 300 includes a context awareness module 336. The context awareness can be used to control noise suppression. For instance, when a user is participating in a telephone conference call, ambient sounds can be kept suppressed. If the user is at home outside working hours, noise suppression can be turned down. In various embodiments, context awareness module 336 is operable to generate triggering events based on a day of a week, time of a day, meetings in user's calendar, location of user (for example, determined by the global positioning system (GPS), identifiers associated with wireless network or cellular phone network), and so forth. In other embodiments, the context awareness can include motion awareness for context. For example, motion awareness can include determination as to whether user is driving, walking, sitting, and so forth. An exemplary system including voice recognition, context awareness, and filtering is discussed in more detail in U.S. patent application Ser. No. 14/749,425, entitled "Context Aware False Acceptance Rate Reduction," filed Jun. 24, 2015, the disclosure of which is incorporated herein by reference for all purposes.

In various embodiments, processing of ambient sound results in allowing only voice to pass through the noise isolating headset. Voice activity detection with filtering may be used to limit the ambient sounds passing through to the voice band. In certain embodiments, more complex processing for example, based on direction of sound sources, is applied to ambient sounds to allow only voice to pass though. Exemplary systems and methods for voice activity detection with filtering are also discussed in more detail in U.S. patent application Ser. No. 14/749,425 referenced above.

In some embodiments, the determination as to whether a trigger event has occurred in order to turn on ambient awareness is based on a user profile and preferences 330. The user profile and preferences 330 may include a default configuration including definitions of triggering events and rules for actions to be taken when the triggering events occur. In other embodiments, the user is allowed to customize the user profile and references using an application running on a network or a host device 116 (shown in FIG. 1). In some embodiments, the customization includes setting the amount of ambient sounds passing through the noise suppression, determining what type of ambient sounds are allowed to pass through the noise suppression, and which events trigger ambient awareness mode.

Figure 4:
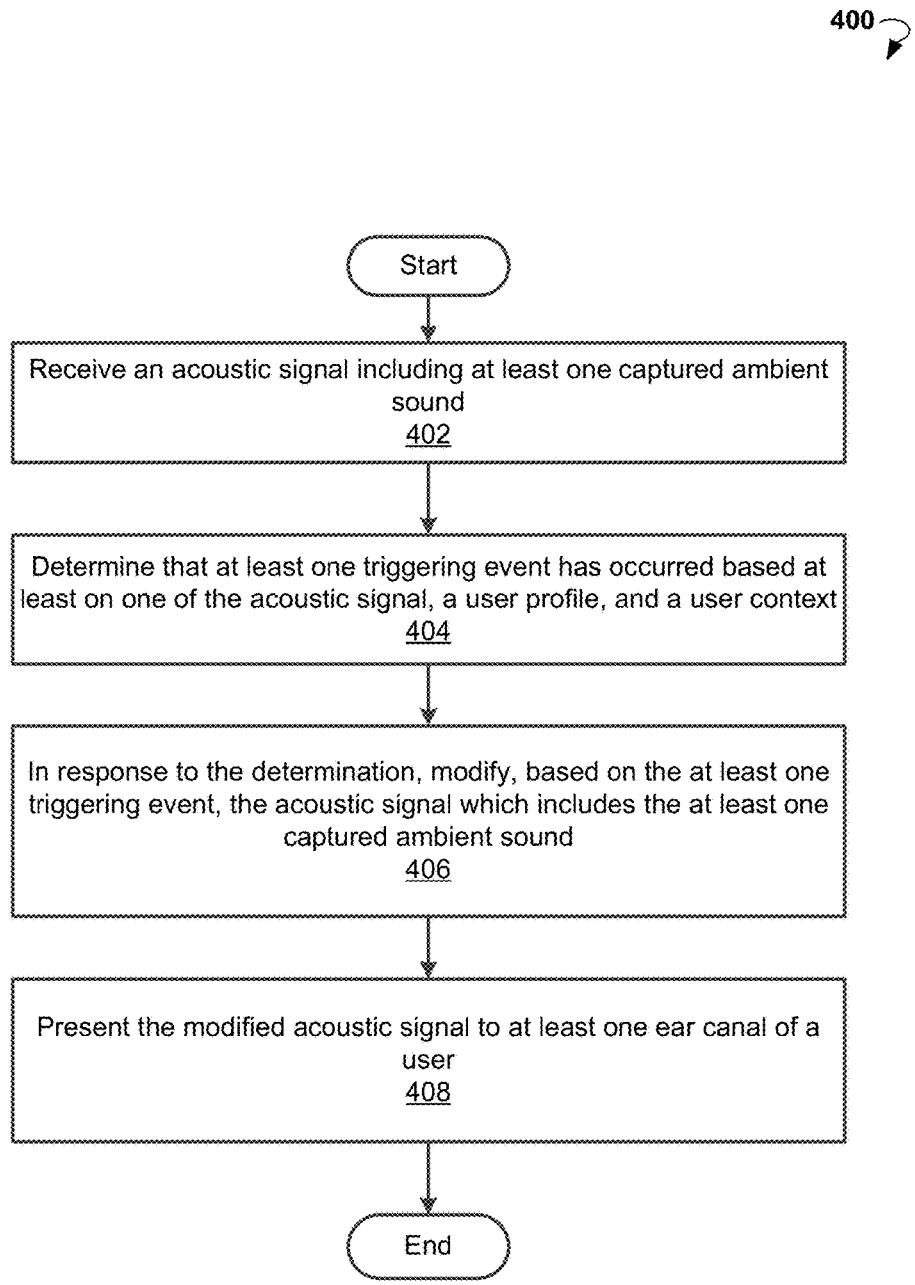
FIG. 4 is a flow chart showing steps of a method for providing ambient awareness, according to an example embodiment.

FIG. 4 is a flow chart showing steps of method 400 for providing ambient awareness mode, according to various example embodiments. Method 400 may commence, in operation 402, with receiving an acoustic signal. In this example, the acoustic signal represents at least one captured ambient sound. In block 404, method 400 includes determining that at least one triggering event has occurred based at least on one of the acoustic signal, a user profile, and a user context. In some embodiments, all or various combinations of the acoustic signal, a user profile, and a user context is the basis for the triggering event. In block 406, in response to the determination, method 400 proceeds with, based on the at least one triggering event, modifying the acoustic signal which represents the at least one captured ambient sound. In block 408, the modified acoustic signal can be provided to at least one ear canal of a user.

Figure 5:
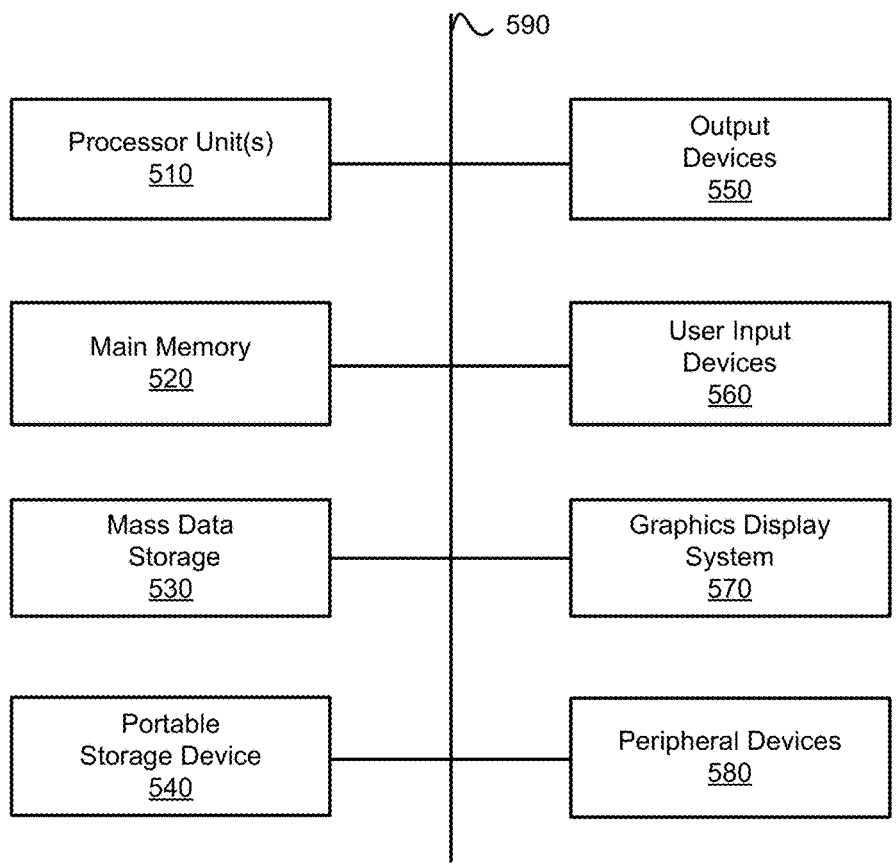
FIG. 5 illustrates an example of a computer system that may be used to implement embodiments of the disclosed technology.

FIG. 5 illustrates an exemplary computer system 500 that may be used to implement some embodiments of the present invention. The computer system 500 of FIG. 5 may be implemented in the contexts of the likes of computing systems, networks, servers, or combinations thereof. The computer system 500 of FIG. 5 includes one or more processor units 510 and main memory 520. Main memory 520 stores, in part, instructions and data for execution by processor unit(s) 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit(s) 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing systems, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for providing ambient awareness, the method comprising:
    receiving an acoustic signal, the acoustic signal representing at least one captured ambient sound;
    determining that at least one triggering event has occurred based at least on a user context including at least that a user is speaking while not currently participating in a telephone call;
    in response to the determination, modifying, based on the at least one triggering event, the acoustic signal; and
    providing the modified acoustic signal to at least one ear canal of the user.

2. The method of claim 1, wherein the modifying includes adjusting an amount of noise suppression performed on the acoustic signal based on the user profile.

3. The method of claim 1, further comprising determining that the at least one triggering event has occurred based at least on detection of a moving object approaching the user at a speed greater than a predetermined threshold.

4. The method of claim 1, further comprising determining that the at least one triggering event has occurred based at least on detection of a specific sound present in the acoustic signal.

5. The method of claim 4, wherein the specific sound includes at least one pre-defined word being spoken.

6. The method of claim 1, wherein the modifying the acoustic signal includes:
    separating the acoustic signal into a voice component and a noise component; and
    keeping the voice component in the acoustic signal while suppressing the noise component.

7. The method of claim 1, further comprising providing to the user at least one of the following: an alert signal and a warning message based on the at least one triggering event.

8. The method of claim 1, further comprising determining that the at least one triggering event has occurred based at least on one or more of a current user location, and a current user movement.

9. The method of claim 1, further comprising determining that the at least one triggering event has occurred based at least on a user profile including at least one definition of the at least one triggering event and at least one rule for the modifying the acoustic signal in response to an occurrence of the at least one triggering event.

10. The method of claim 9, further comprising providing an application for customizing the user profile.

11. The method of claim 9, wherein the at least one triggering event is based on a combination of at least two of the acoustic signal, the user profile, and the user context.

12. A system for providing ambient awareness, the system comprising:
    a processor; and
    a memory communicatively coupled with the processor, the memory storing instructions which, when executed by the processor, cause the processor to perform a method comprising:
        receiving an acoustic signal, the acoustic signal including at least one captured ambient sound;
        determining that at least one triggering event has occurred based at least on a user context including at least that a user is speaking while not currently participating in a telephone call;
        in response to the determination, modifying, based on the at least one triggering event, the acoustic signal; and
        providing the modified acoustic signal to at least one ear canal of a user.

13. The system of claim 12, wherein the modifying includes adjusting an amount of noise suppression performed on the acoustic signal based on the user profile.

14. The system of claim 12, the method further comprising determining that the at least one triggering event has occurred based at least on detection of a moving object approaching the user at a speed greater than a predetermined threshold.

15. The system of claim 12, the method further comprising determining that the at least one triggering event has occurred based at least on detection of a specific sound present in the acoustic signal, the specific sound including at least one pre-defined word being spoken.

16. The system of claim 12, wherein the modifying the acoustic signal includes:
    separating the acoustic signal into a voice component and a noise component; and
    keeping the voice component in the acoustic signal while suppressing the noise component.

17. The system of claim 12, further comprising providing to the user one of an alert signal and a warning message based on the at least one triggering event.

18. The system of claim 12, further comprising determining that the at least one triggering event has occurred based at least on one or more of a current user location, a current user movement, and a current position taken by the user.

19. The system of claim 12, further comprising determining that the at least one triggering event has occurred based at least on a user profile including at least one definition of the at least one triggering event and at least one rule for the modifying the acoustic signal when the at least one triggering event occurs.

20. The system of claim 19, further comprising providing an application for customizing the user profile.

21. A non-transitory computer-readable storage medium having embodied thereon instructions, which, when executed by at least one processor, cause the processor to perform a method comprising:
    receiving an acoustic signal, the acoustic signal including at least one captured ambient sound;
    determining that at least one triggering event has occurred based at least on a user context including at least that a user is speaking while not currently participating in a telephone call;
    in response to the determination, modifying, based on the at least one triggering event, the acoustic signal; and
    providing the modified acoustic signal to at least one ear canal of a user.

* * * * *